INVENTOR.
Raymond J. Lamb
Roger T. Kiley
BY Norman N. Popper
ATTORNEY

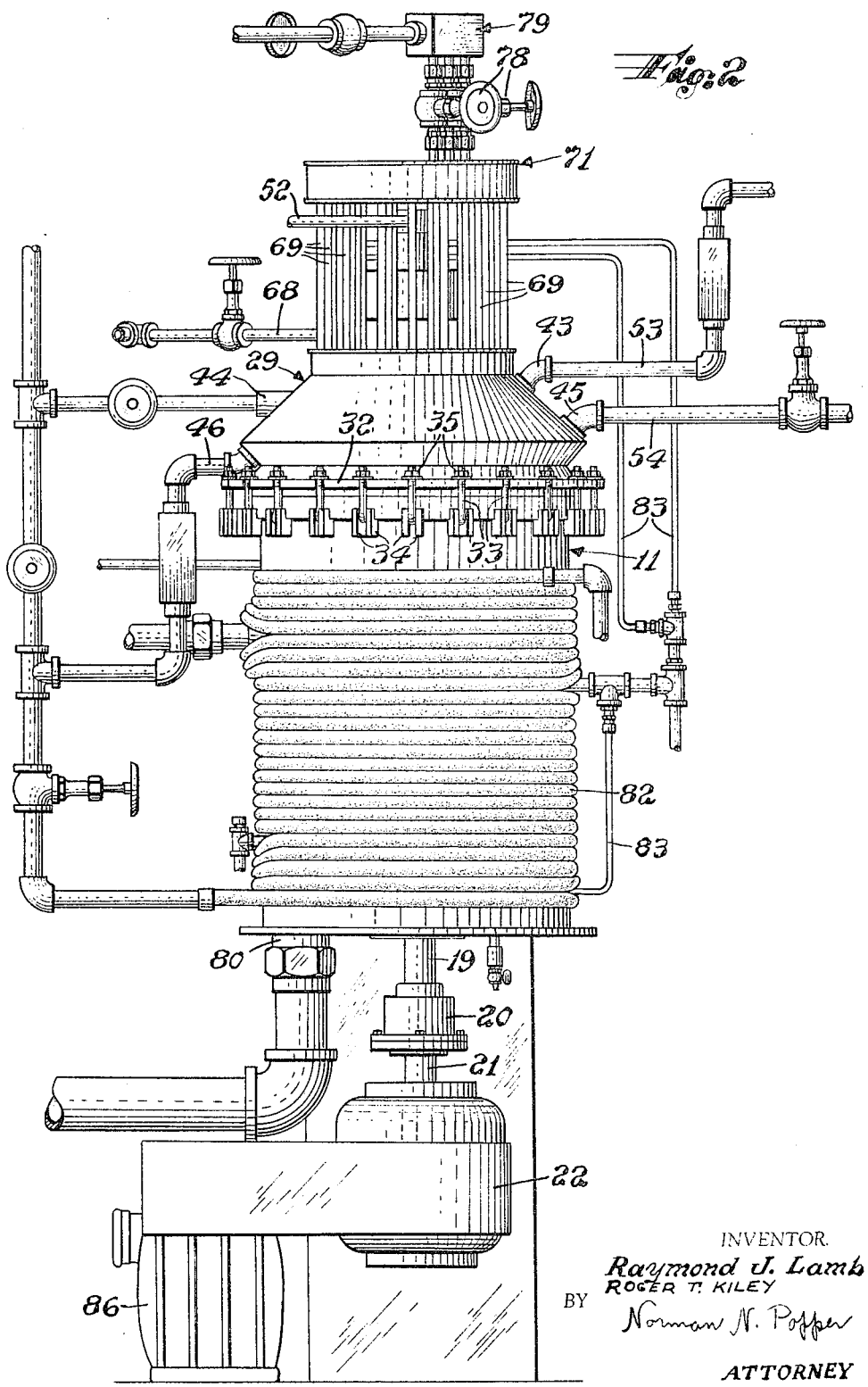

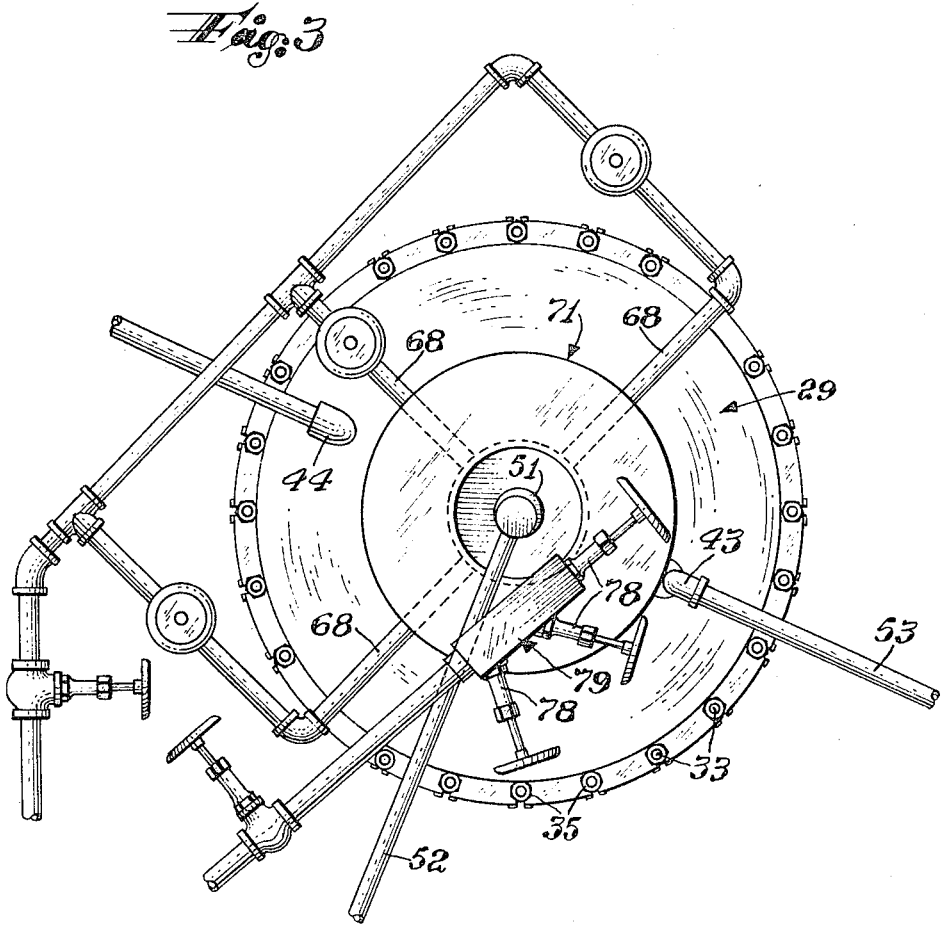
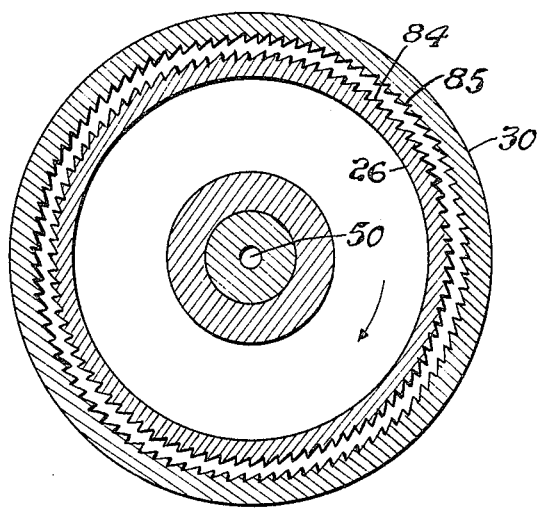

United States Patent Office 3,285,702
Patented Nov. 15, 1966

3,285,702
APPARATUS FOR CONDITIONING MATERIAL
Raymond J. Lamb, 390 Highland Ave., Ridgewood, N.J., and Roger T. Kiley, 28 Van Reypen St., Jersey City, N.J.
Filed Dec. 3, 1962, Ser. No. 241,707
11 Claims. (Cl. 23—252)

While this is a joint application, we have referred to the inventors in the singular in the specification for convenience. All singular pronouns and verbs relating to the inventors in the application should be deemed to be plural.

My invention relates generally to apparatus and methods for conditioning material and specifically to apparatus and methods for conducting chemical reactions.

My present application more specifically relates to apparatus and methods for conducting a wide variety of chemical reaction, both inorganic and organic which may be either exothermic or endothermic. In addition, such non-chemical operations such as distillation, extraction, dilution, mixing and the like in which the materials are conditioned in one manner or another may be practiced by my methods and by means of my apparatus. Still further, nuclear reactions involving the use of radiation to effect nuclear reorientation or nuclear induced chemical reactions may also be practiced by my methods and apparatus.

The basic organic chemical reactions may be classified generally as nitration, halogenation, sulfonation, amination, oxidation, hydrogenation, esterification, hydrolysis, polymerization, hydroformylation and alkylation. The physical state of the input reactants may vary widely in each of these reactions. The reactions may thus be liquid-liquid, liquid-gas, gas-gas, liquid-solid, gas-solid, or solid-solid. In addition, catalysts may be employed which themselves may assume any of the three physical states aforementioned. Because of the enormous number of different combinations of reactants and catalysts possible, the chemical industry has been unable to devise a universal method for conducting almost all organic reactions and a universal apparatus in which they would be conducted. A similar situation exists for inorganic and nuclear reactions. In effect, no one method and no one apparatus is known today which can be modified sufficiently to accommodate the precise chemical and physical characteristics demanded by each reaction or operation.

For instance, the reaction kettle is commonly employed for the liquid-liquid reaction whereas the reaction column is preferred for the liquid-gas reaction. Even under the best of conditions, however, both the structure of the kettle and the method of performing the reaction must be drastically altered to accommodate each specific reaction. Some reactions may demand, for example, a gentle circulation of the reactants in the kettle whereas others require violent agitation. In still other reactions, enormous quantities of heat must be removed whereas in still other reactions enormous quantities of heat must be supplied to the reactants. Similarly, in the case of the reaction column, the height of the column, the number and types of bubble caps, the density of packing and the like must be tailored to meet the demands of each specific reaction.

Perhaps the greatest difficulty encountered when attempting to devise universal apparatus and methods for conducting chemical reactions lies in maintaining both great precision and great flexibility of reaction conditions. For example, it is necessary to provide precise control of such parameters as temperature, concentration of reactants and reaction products, concentration and distribution of catalysts, pressure, diffusion or distribution of reaction constituents and the like. In some instances, desirable characteristics are mutually incompatible. Generally, the reaction rate will increase with an increase in temperature. In an exothermic reaction, the rate of heat generation increases with the rate of reaction. From an economic standpoint, it is most desirable to increase the rate of reaction in many common industrial processes, as for example, sulfonation in which the reaction normally proceeds at a relatively slow rate. However, increased reaction rates increase the temperature of the reaction and produce substantial product carbonization, degradation or pyrolysis resulting in low yields and contaminated or otherwise commercially unacceptable products. Presently known methods and apparatus provide but an unhappy compromise between these mutually incompatible desiderata.

A similar situation arises in the case of the reaction employing a catalyst. Efficiency of a catalyst is generally dependent upon the amount of surface area available for contact with the reactants. When a reaction column is employed as the reaction vessel, the catalyst is frequently introduced as a cladding to internal structural members. In the alternative, the catalyst may be introduced as a packing to the column. However, it is readily obvious that the amount of surface area available would be substantially increased were the catalysts to be introduced as a rapidly flowing finely divided and dispersed powder in the case of a solid or liquid or vapor or other means were provided to increase the number of collisions between reactant particles and the catalytic surface within the reactor. Here too, temperature is frequently a problem. With the increased efficiency of catalytic action, the rate of reaction increases and, in the case of exothermic reactions, the rate of heat generation increases which could produce the undesirable results aforementioned.

Still another problem is encountered when employing mutually insoluble or immiscible reactants. Solvents are frequently employed to effect interaction of such mutually insoluble reactants. However, a universal solvent reduces the effectiveness of catalysts, reduces the maximum concentration of reactants and thereby frequently increases reaction time and decreases reaction efficiency. Moreover, the final reaction products must be separated from the solvent requiring time consuming further procedures.

The degree and efficiency of reactant and reaction product dispersion is also a problem. In the case of the reaction kettle wherein the reaction proceeds through a large mass of liquid reactants and reaction products, it is virtually impossible to conduct the reaction at extremely high speeds without encouraging undesirable side reactions. For instance, in many organic reactions, the final product is largely dependent upon the temperature and concentration of reactants during the course of the reaction. As reaction rates increase throughout a large mass in which the distribution of the reactants, and reaction products, together with reacting constituents is poor, the temperature and concentration is uneven and side reactions, carbonization, pyrolysis, degradation and low yield can be expected. Even the best of agitation devices are unable to maintain proper conditions in such catalysts. The only solution is to decrease the rate of reaction.

In the case of the reaction kettle, the overall tempearture of reaction is frequently the greatest problem. In an exothermic reaction, the amount of heat generated during the course of reaction must be dissipated through the walls of the kettle or through some sort of heat exchange means located within the kettle. The problem is twofold; first to withdraw the heat of reaction evenly throughout the reacting mass and secondly to provide heat exchange means capable of handling the total amount of exothermic heat of reaction. In the reaction kettle, the temperature frequently rises in local areas within the reacting mass whereas the overall temperature of the reacting mass remains much lower. The result is carbonization or degradation of reaction constituents at that point. Moreover, in large kettles, it is nearly impossible to rapidly withdraw the total exothermic heat of reaction. Here too, the only acceptable solution is to decrease the rate of reaction.

The same comments may be made with respect to endothermic reactions as have been made above respecting exothermic reactions. Moreover, it is frequently more difficult to introduce heat into a reacting mass evenly and under precise controls than it is to withdraw heat.

Therefore, it is among the objects and advantages of my invention to provide apparatus and methods for conducting chemical reactions which will provide precise control over all reaction parameters irrespective of the nature of the reaction or the physical state of the reaction constituents.

Another object of my invention is to provide apparatus and methods for conducting chemical reactions which provide extremely rapid, efficient and even dissipation or infusion of heat throughout the reacting constituents.

A further object of my invention is to provide apparatus and methods for conducting chemical reactions which promote extremely rapid reaction rates by insuring even and intimate mixing of reaction constituents.

Yet a further object of my invention is to provide apparatus and methods for conducting chemical reactions which promote extremely rapid reaction rates and exothermic reactions without degradation, carbonization or pyrolysis of reaction constituents.

Still a further object of my invention is to provide apparatus and methods for conducting chemical reactions which provide for maximum catalytic efficiency by drastically increasing the reactive surface area per unit weight of catalysts and the time of contact during the course of a reaction irrespective of the nature of the reaction or the physical state of the reaction constituents.

Yet a further object of my invention is to provide apparatus and methods for conducting chemical reactions which may effect rapid and efficient reaction between mutually insoluble or immiscible reactants without the use of universal solvents.

A further object of my invention is to provide apparatus and methods for conducting chemical reactions which provide extremely rapid reaction rates with precise control of all reaction parameters and the nature and yield of the reaction product.

Still another object of my invention is to provide apparatus and methods for conducting chemical reactions which promote a rapid and efficient reaction with more nearly stoichiometric proportion of reactant.

Another object of my invention is to provide apparatus and methods for conducting chemical reactions which provide precise control of both the nature and degree of the reaction while promoting extremely rapid reaction rates.

These objects and advantages as well as other objects and advantages may be achieved by the apparatus and methods hereinafter detailed; one embodiment of the apparatus having been shown in the drawings in which:

FIGURE 2 is a side elevational view of the apparatus shown in FIGURE 1 including the drive mechanism;

FIGURE 3 is a top plan view of the apparatus shown in FIGURE 2.

FIGURE 4 is a top plan cross-sectional view of the stator and rotor.

Figure 1:
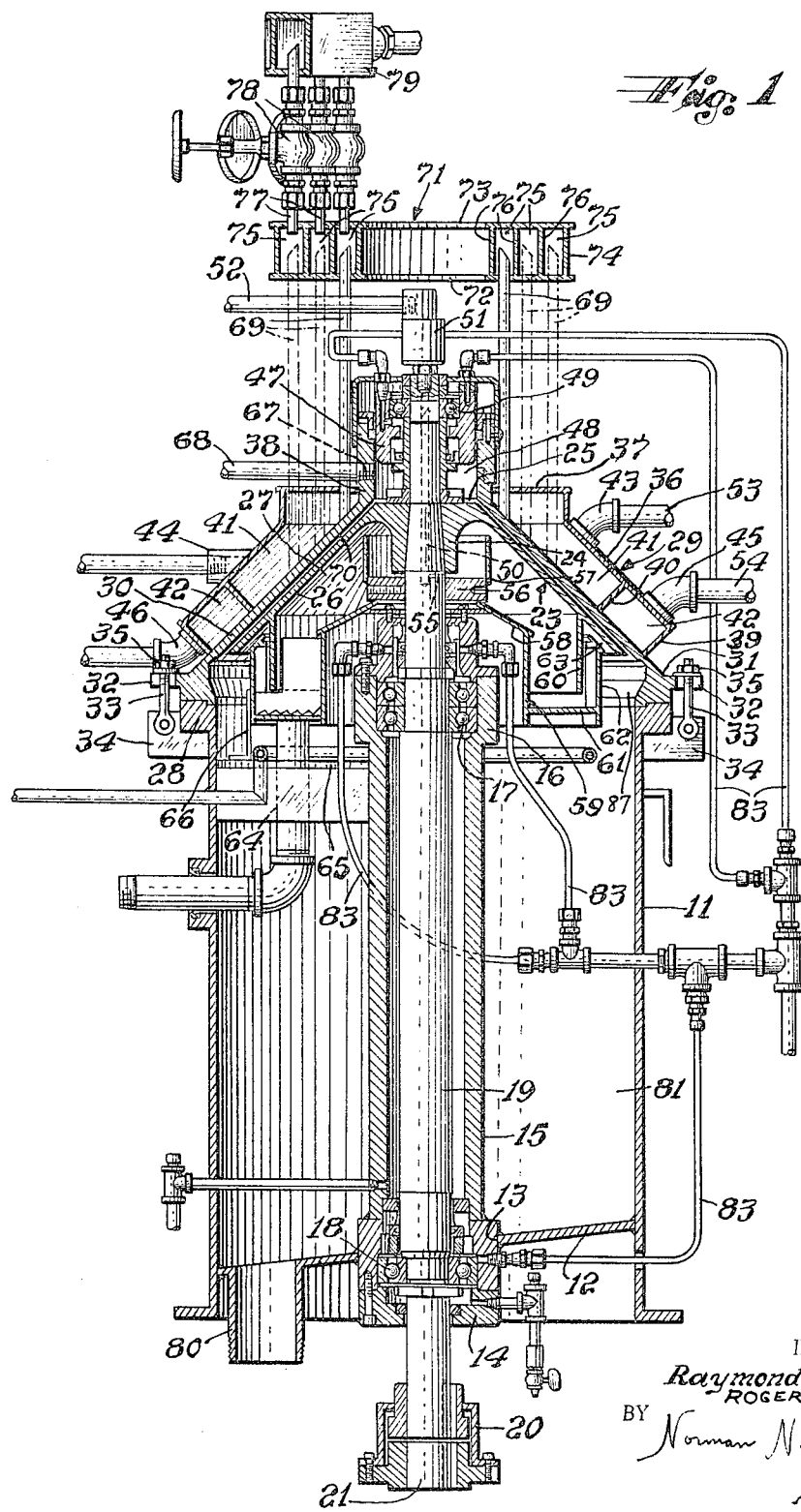
FIGURE 1 is a side elevational cross-sectional view of one embodiment of my apparatus for conducting chemical reactions in accordance with my methods.

Basically, my process comprises introducing reactants into a chamber between a stator having a generally truncated, inverted conical cavity and a generally truncated, upright conical rotor rotatably mounted therein. One reactant is adapted for introduction onto the truncated top of the rotor while the other reactant is adapted for introduction onto the outwardly and downwardly flaring generally conical peripheral wall of the rotor. Depending upon the weight, viscosity and density of the reactants and the speed of rotation of the rotor, the reactants will be impelled by centrifugal force outwardly and downwardly over the conical peripheral surface of the rotor or may be thrown violently centrifugally outwardly to bound and rebound between the rotor and stator. The bounding and rebounding reduces the reaction constituents to a fine mist, and, in some instances, to a near molecular state as reaction proceeds.

Referring now to the drawings in detail, my apparatus comprises a generally cylindrical vessel 11 oriented with its axis of symmetry generally vertical. The vessel 11 is provided with a flat bottom 12 oriented at a slight angle to the horizontal. The bottom 12 is provided with a circular opening 13 concentric with its center adapted to receive a lower bearing body 14. An elongated cylindrical sleeve 15 is rigidly mounted on the top of the bearing body 14 concentric with the vessel 11 with a second or upper bearing body 16 rigidly mounted on the top of the cylindrical sleeve 15. The upper and lower bearing bodies, 16 and 14, are provided with forced-oil lubricated bearings respectively, 17 and 18. The bearings 17 and 18 support a generally vertical elongated rotatable shaft 19, the axis of which is concentric with the axis of the vessel 11. The lower end of the shaft 19 extends beneath the vessel 11 and is connected through a coupling 20 to the power output shaft 21 of a vari-drive transmission 22.

A symmetrical rotor 23 is rigidly mounted to the shaft 19 for rotation therewith above the upper bearing body 16. The rotor 23 is provided with a depending central support portion 24 engaged to the shaft 19 and a generally flat top 25. Formed integrally with the top 25 of the rotor 23 is a relatively thin outwardly and downwardly flaring wall 26 defining thereunder a splash chamber 27 for a suitable coolant. The entire rotor thus has a generally upright, truncated conical appearance.

The top of the cylindrical vessel 11 is provided with an annular, radial flange 28 upon which a stator 29 is mounted. The stator 29 comprises an outwardly and downwardly flaring inner wall 30 which may be parallel to the wall 26 of the rotor 23 or which may lie in a somewhat non-parallel relationship thereto diverging therefrom progressively towards the bottom of the stator. The stator 29 is symmetrical and its axis of symmetry coincides with the axis of rotation of the rotor 23. The lower end of the inner wall 30 of the stator 29 terminates in a generally flat-bottomed annular mounting flange 31 which is adapted to engage the flange 28 on the cylindrical vessel 11 thereby mounting the stator 29 thereon. The mounting flange 31 on the bottom of the stator 29 is provided with a plurality of peripheral ears 32 having open ended radial slots therein and adapted to receive a threaded stud 33 pivotally mounted to an L-shaped lug 34 which is in turn secured to the vessel 11 beneath the flange 28. A nut 35 threadably engaged to the top of the stud 33 and compressibly engaged to the ear 32 securely fastens the stator 29 to the vessel 11.

The stator 29 is provided with an outwardly and downwardly flaring outer wall 36 and a generally flat annular horizontal top 37 having a passage in the center. A vertical, elongated annular collar is formed on the top 37 about the passage. A bottom wall 39 extends between the inner wall 30 and outer wall 36 of the stator 29 at the respective bottoms thereof. An intermediate separator wall 40 extends between the inner wall 30 and outer wall 36 of the stator 29 above the bottom wall 39, thereby defining a separate upper coolant chamber 41 and a lower coolant chamber 42. The upper chamber 41 is provided with a coolant inlet port 43 and an outlet port 44. Similarly, the lower coolant chamber 42 is provided with a coolant inlet port 45 and a coolant outlet port 46.

A top bearing body 47 is rigidly mounted within the collar 38 on the top 37 of the stator 29 spaced away from the top 25 of the rotor 23 which is located at approximately the level of the top 37 of the stator 29 thereby defining a reactant inlet chamber 48. A bearing 49 mounted in the bearing support 47 rotatably supports the top of the rotating shaft 19. The shaft 19 is provided with a coolant bore 50 concentric with its axis extending from the top thereof downwardly. A coolant inlet port 51 is connected to the top of the shaft 19 communicating with the bore 50. The inlet port 51 is in turn connected to a suitable coolant supply conduit 52. It should be noted that the coolant supply conduit 52 may be interconnected through an appropriate valve system not shown with the coolant supply conduits 53 and 54 connected to the inlet ports 43 and 45 for the upper coolant chamber 41 and lower coolant chamber 42 of the stator 29.

The coolant supply bore 50 in the shaft 19 extends downwardly beneath the level of the central support portion 24 of the rotor 23 communicating with a radial coolant discharge passage 55. The discharge passage 55 communicates with the chamber 27 beneath the conical wall 26 of the rotor 23. An annular, radial support flange 56 is mounted on the upper bearing body 17 beneath the discharge passage 55. A vertical, upwardly extending annular deflector wall 57 is in turn mounted on the outer periphery of the support flange 56. The deflector wall 57 terminates somewhat beneath the conical wall 26 of the rotor 23. A generally annular outwardly and downwardly flaring shield 58 is mounted to the upper bearing support 16 beneath the support flange 56. An annular, generally vertical, depending wall 59 is formed on the periphery of the shield 58. A second annular, downwardly extending wall 60 is formed on the interior surface of the wall 26 of the rotor 23 near its bottom edge. An inclined bottom wall 61 is formed on the bottom of the annular downwardly extending wall 59 extending radially therefrom and inclined from the horizontal. On the outer end of the bottom wall 61 there is an upstanding annular baffle 62 having an upwardly and inwardly inclined top 63. The baffle 62 is positioned radially beyond the wall 60 on the rotor 23. The top 63 is in slidable engagement with the downwardly extending annular wall 60. A discharge conduit 64 communicates with the inclined bottom wall 61 at its lowermost portion extending downwardly into the vessel 11 and then outwardly therethrough. There is provided a radial support arm 65 extending between the inner surface of the wall of the vessel 11 to the cylindrical sleeve 15. An angle iron 66 mounted on the support arm 65 is engaged to the upwardly extending baffle 62 providing support for this structure.

The upstanding annular collar 38 on the stator 29 is provided with three inlet reactant passages 67 communicating with the reactant input chamber 48. The reactant input passage 67 is connected to a suitable source of reactant supply 68. A plurality of additional reactant input conduits 69 extend through the inner wall 30 of the stator 29 communicating with the reaction chamber 70 between the stator 29 and the rotor 23. The opposite ends of each conduit 69 is connected to a reactant input manifold 71, the conduits 69 extending through the top 37 of the stator 29 and through the bottom 72 of the manifold 71. The manifold 71 has an annular configuration having an annular top wall 73, an annular bottom wall 72, and an outer peripheral wall 74. It should be noted that the reactant input conduits 69 may be disposed circularly to communicate with the reaction chamber 70 at various positions about the stator 29. However, those conduits 69 whose ends lie in the same horizontal plane extend upwardly into separate manifold supply chambers 75 defined by annular inner walls 76. Each of the chambers 75 is connected through a separate pipe 77 and valve 78 to a main reactant input manifold 79 which is in turn connected to an appropriate supply of reactant.

The bottom 12 of the vessel 11 is provided with a discharge port 80. The vessel 11 defines a collection chamber 81 adapted to receive the reactant product. In addition, the vessel 11 may be provided with a continuous external coolant coil 82 shown in FIGURE 2. In addition, each of the bearings 17, 18 and 49 are connected through conduits 83 to a source of supply of oil which is force-fed thereto.

In FIGURE 4 I have shown a cross-sectional view of the rotor and stator 23 and 29 respectively. It should be noted that the external portion of the wall 26 of the rotor 23 is provided with a plurality of saw tooth ribs 84, the crest edges of which are straight. Similarly, the interior surface of the inner wall 30 of the stator 29 is provided with corresponding saw tooth ribs, 85, the crest edges of which are generally parallel and opposed to the crest edges of the ribs 84 on the rotor 23. It should be noted that the ribs 84 and 85 on the rotor 23 and stator 29 respectively diverge from each other as they approach the bottom of their respective members. Additional ribs may be provided therebetween beginning at lower levels. Still further, the particular configuration of the irregularities on the rotor and stator as described in my co-pending U.S. patent application, aforementioned, may be employed.

In operation, reactants are introduced from a plurality of sources. In a common reaction employing two different liquid reactants, A and B, one reactant, for example, A, is introducted into the upper most manifold 79. The liquid overflows the ends of pipes 77 extending downwardly therefrom through valves 78 into the lower manifold 71. In the drawings. I have shown the lower manifold 71 to have an annular shape and to be divided into three separate annular chambers, each chamber supplied by one pipe 77. As each of the chambers 75 fill, the liquid reactant will overflow the reactant supply conduits 69 extending thereinto. The reactant A thereupon flows downwardly under the influence of gravity through each of the conduits 69 discharging into the reaction chamber 70 between the rotor 23 and stator 29. In this fashion, the discharge pressure of the reactant A is essentially the same through each level of conduits 69 and discharges onto the rotor at different levels and positions thereupon more evenly distributing the input reactant A. In addition, it should be noted that by controlling the respective valves 78, the rate of reactant input through each level of conduits 69 may be carefully controlled separate and apart from other levels.

The second reactant B is introduced through input conduit 67 discharging into the input reaction chamber 48 beneath the top bearing body 47 and the top 25 of the rotor 23 within the upstanding annular collar 38 on the top of the stator 37. From thence, the reactant B passes downwardly to the top 25 of the rotor 23 to be centrifugally impelled outwardly and downwardly over the conical wall 26 thereof. In this manner, reactant A and reactant B may be intermixed. As the reactants are introduced, a motor 86 imparts rapid rotation to the shaft 19 rotating the rotor 23. In most instances, reactant B is thrown outwardly at great velocity against the wall 30 of the stator 29 striking with great force. It thereupon rebounds to the rotor 23 to be once again centrifugally impelled against the stator 29. Similarly, reactant A introduced through conduit 69 falls first upon the conical wall 26 of the rotor 23 to bound and rebound in the fashion described above with respect to reactant A. The ribs 84 and 85 on the rotor 23 and stator 29 respectively contribute substantially to the efficiency of the bounding and rebounding of the reactants A and B. In many instances, the reactants are reduced to an extremely fine mist and sometimes to a near molecular form. Obviously, there is an intimate and rapid mixing of the reactants which enhances the rate or reaction. However, since the reactants are so finely divided as are the reaction products as they form, any heat generated by the reaction may be quickly and easily dispersed through the cool walls of both the stator 29 and the rotor 23. There is no danger of local reaction due to over concentration of reactants in one position or to product degradation due to excessive heat generated by local reactions or building up at one or more points where reaction occurs.

It is essential that both the stator and rotor be provided with rapid and efficient heat transfer means. Thus, the heat of reaction and an exothermic reaction may be quickly removed or heat supplied to an endothermic reaction in accordance to needs. The cooling process is identical in operation to the heating process. The only difference being in the fact that in the cooling process a coolant having a temperature lower than the heat generated by the reaction is employed whereas in a heating process, a fluid having a temperature higher than the heat of reaction is employed. In operation, coolant is introduced through the inlet ports 43 and 45 to flow through coolant chambers 41 and 42 in the stator 29 being discharged through outlet ports 44 and 46. A plurality of inlet and outlet ports is provided in order to vary the temperature of the stator or the rate of cooling at different points. Obviously, of course many other coolant inlet and outlet ports could be provided separate and distinct from each other.

The rotor is cooled by passing water down thorugh the bore 50 in the shaft 19. Centrifugal force impels the water radially outwardly through the radial discharge passage 55 whereupon it strikes the baffle 57. The water bounds upwardly against the interior of the wall 26 of the rotor 23. Centrifugal force thereupon flows the water outwardly along the interior surface of the wall 26 of the rotor 23 and downwardly to engage the wall 60 formed on and depending from the interior surface of the wall 26 of the rotor 23 near its bottom edge. The water then falls downwardly upon the inclined bottom 61 of the water catch basin flowing towards the discharge conduit 64 thereupon passing downwardly and outwardly through the wall of the vessel 11. It should be noted that the wall 60 on the rotor 23 rotates therewith. However, all other components employed to disperse and catch the water cooling the rotor are rigidly mounted to the upper bearing body 16 and, therefore, do not rotate. The upstanding annular baffle 62 on the periphery of the bottom wall 61 having its inclined top 63 is devised merely as a vapor trap to prevent water cooling the rotor from mixing with the reactants and products.

As the reaction proceeds and the reaction products are formed, the entire mass of atomized particles is impelled outwardly and downwardly through the reaction chamber 70 discharging from the end thereof and falling downwardly through the annular space 87 between the baffle 62 and the side wall 30 of the stator 29. The reactants drop downwardly into the vessel 11 falling onto its inclined bottom 12. From thence, it flows under the influence of gravity to the discharge port 80 passing therethrough to some suitable storage vessel.

By way of illustration, I have chosen to describe one particular organic reaction, that of sulfonation of dodecylbenzene with oleum or sulfuric acid.

The industrial process employed to sulfonate dodecylbenzene involves the following reactions:

(1) 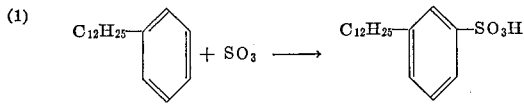

(2) 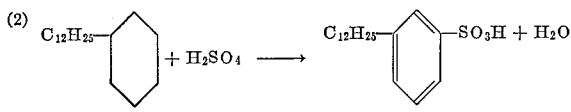

The residual crude of sulfonated oil and sulfuric acid is washed with water to dilute the excess acid and facilitate separation of the spent acid from the sulfonated product. This separation is effected by permitting the mixture to settle in a holding tank and decanting the sulfonated oil from the top.

The oil layer, still containing a small percentage of residual acid, is then neutralized with dilute, twenty percent sodium hydroxide. This reaction may be represented by the following formulas:

(1) 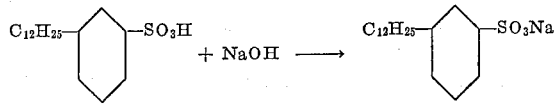

(2) $H_2SO_4 + 2NaOH \rightarrow Na_2SO_4 + 2H_2O$ a sodium salt of the sulfonated acid is formed and may be collected and spray dried. The product is then ready for combination with other additives and packaging.

Principal problem in the production of sulfonated dodecylbenzene which is the principal constituent of many common household detergents is the maintenance of a light colored product and high conversion yield. The color and percent conversion desired are obtained in practice by carefully controlling the heat evolved during the sulfonation reaction and by operating that is low and acid to dodecylbenzene ratio is possible during the sulfonation process to prevent product degradation. These two desideratums are mutually inconsistent and are difficult to achieve. While low temperatures and low acid ratios favor a light colored product, they tend to decrease the percent conversion of the oil.

The commonly employed industrial sulfonation agents are gaseous or liquid sulfur trioxide, oleums and ninety eight percent sulfuric acid. Of these, gaseous sulfur dioxide is most attractive economically since nearly stoichiometric proportions of reactants may be employed, the wash step may be eliminated and a product of superior color results. However, industrial processes employing sulfur trioxide are rare due to the uncontrollable heat of reaction evolved upon mixing the reactants. Such uncontrollable heat of reaction frequently militates against the color of the product since product degradation is most common. Oleums share some of the advantages of sulfur trioxide and are currently the preferred and most widely used sulfonating agent.

Sulfuric acid may be employed but is weak and tends to dilute the product. Moreover, extensive neutralization and product separation must be performed.

At present, typical acid to oil ratios employed in industry vary from 1.33 to 1.00 pounds of twenty percent oleum per pound of dodecylbenzene which is equivalent to 4.0 to 2.5 mols of oleum (104.5% sulfuric acid) per mol of dodecylbenzene. The oleum is added slowly over a period of from 1 to 1½ hours whereupon the reaction is but ninety percent complete. The mass is digested at 115° F. for an additional two hours. After digestion, a yield of 98% of sulfonic acid may be expected. However, the product has a dark color which is commercially unacceptable. If the temperature is maintained at a level below 85° F., a product having a better and lighter color is obtained. However, in order to compensate for the lower reaction rate and the low yield produced by such temperatures, the acid ratio must be raised to 1.38 to 1. This is extremely uneconomical.

In the range of acid ratio aforementioned, the yield or percent conversion is essentially rate controlled. However, in a solution of seventy-eight percent sulfuric acid (based on the aqeous phase) an equilibrium controls the reaction and the reaction will not proceed any further toward the sulfonic acid.

If the acid ratio in a system employing twenty percent oleum is .5041 (1.4 mols to 1) one hundred percent conversion to the sulfonate will occur just before the acid concentration reaches seventy-eight percent. If one hundred percent conversion is to be attained, therefore, an acid ratio of at least .5 to 1 must be employed. This demonstrates why sulfonation with sulfur trioxide is so attractive. Water is not a product of this reaction and if the system is kept anhydrous, the molar ratio of reactants may in theory at least be 1 to 1. For this reason in turn, color degradation due to over sulfonation is lessened if, and only if, there is provided a sufficiently efficient means for dissipating the heat of reaction evenly throughout the entire reacting mass.

In one experiment with my apparatus and employing my procedures which I employ as an example, twenty percent oleum and dodecylbenzene were reacted. The dodecylbenzene was passed through input conduit 67 passing into the reactant inlet chamber 48 passing thence upon the rotor 23. The oleum was admitted through reactant inlet conduits 67 discharging upon the rotor 23. The temperature of the rotor and stator were controlled by water circulating through the cooling jacket in the stator and water passing over the interior surface of the rotor 23. The following table demonstrates the various results obtained under different conditions.

downwardly through the input conduit 67. The heat of reaction is removed in the manner described above. If desired, phosphates, coloring agents and the like may be added to the slurry during the neutralization phase. The slurry is then ready for spray drying or concentration for use in a liquid form.

It should be noted that since the rate of reactant input may be carefully controlled by means of my apparatus, the rate of reaction may be controlled in the first instance. In addition, the temperature of the reaction chamber and the reacting material may be carefully controlled by means of the coolants circulating through the jackets in the stator and the coolant passing over the interior wall of the rotor. The rate of coolant delivery to each of these elements may be carefully controlled and there may also be produced a temperature gradient by means of the separate water jackets in the stator. However, most important, the complete dispersion of the reacting constituents in the reaction chamber by the bounding and rebounding between the stator and rotor permit the dissipation of heat of reaction at an extremely rapid rate. Thus, there is no temperature buildup at any point and no product degradation. Moreover, such dispersion of reaction constituents maintains

| Run | R.p.m. | Oleum | G.p.m., oil | Temp.,° F. | Acid/Oil Ratio | Percent Reaction | Color |
|---|---|---|---|---|---|---|---|
| 1 | 2,500 | .32 | .54 | 90 | 1.29 | 98.7 | Fair. |
| 2 | 3,500 | .32 | .54 | 82 | 1.29 | 98.9 | Fair. |
| 3 | 3,500 | .40 | .68 | 98 | 1.29 | 97.2 | Poor. |
| 4 | 3,500 | .40 | .68 | 88 | 1.29 | 97.2 | Fair. |
| 5 | 3,500 | .25 | .75 | 78 | 1.00 | 99.0 | Excellent. |
| 6 | 4,000 | .25 | .75 | 78 | 1.00 | 98.7 | Excellent. |

It was apparent that sulfonation was completed in the reaction chamber 70 and did not proceed further in sample bottles prior to analysis of the product. The sulfonations were completed in one pass through the reaction chamber which consumed a very short period of time of seconds.

In another method, dodecylbenzene was reacted with oleum in the manner aforementioned. The operating temperature was maintained at approximately 125° F. The reaction required but a few seconds of residence time within the reaction chamber 70 for ninety-five percent conversion. The reaction mass was discharged from the collection chamber 81, and passed into a digestion column to be held for a few minutes to bring the conversion to ninety-nine percent. The total reaction time was but a matter of minutes and product color degradation did not present a problem.

From the digestion column, the reaction mass was again passed through the apparatus and mixed with water. In this case, the water may be conveniently introduced through the conduit 67 passing down upon the top 25 of the rotor 23 and the reaction mass passed through the manifold 71 to flow downwardly through conduit 69 through the stator 29 and onto the rotor 23. The heat of dilution was removed in the manner in which the heat of reaction was removed earlier. The mixture was then collected and centrifuged. The light layer from the centrifuge is concentrated sulfonic acid while the heavy layer is sulfuric acid in the range of seventy-eight to eighty percent by weight. This range of sulfuric acid concentration, as stated above, has been found to be an optimum value, taking into account product losses, corrosion costs and the resale of the spent sulfuric acid.

The light layer of concentrated sulfonic acid discharged from the centrifuge is then passed through the apparatus again mixed with caustic. Here again, the caustic may be introduced through the input port 67 discharging upon the top 25 of the rotor 23. The sulfonic acid is passed a constant reactant concentration throughout preventing local reactions which could result in product degradation and low yields. Since the reaction pyrometers of temperature, concentration, and pressure can be so carefully maintained, the apparatus may be employed for any reaction. In addition, the reaction may be conducted at a rate unheard of in the past without interfering with the yield or product quality.

I have described one organic chemical reaction which may be considered typical of chemical reactions generally. Of course, catalysts could be introduced in the manner in which the reactants are introduced either together with the reactants or separately. If the catalysts cannot be conveniently introduced in the manner in which the reactants are introduced, the interior surfaces of the reaction chamber 70, the interior surface of the wall 30 of the stator 29 or the exterior surface of the wall 26 of the stator 29 may be clad with the catalysts.

In some instances, it may be desirable to treat the reacting products to some form of nuclear radiation. Sources of nuclear radiation may be embedded in the stator or rotor. If embedded in the rotor, the source will pass the same points in the reaction chamber many times a minute thereby greatly increasing the efficiency of the radiation. Moreover, the radiation is distributed evenly throughout the reaction chamber. The same considerations hold true for reactions employing actinic light which may be supplied through the stator or rotor.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. An apparatus for conducting reactions comprising,
   (a) a generally vertical truncated conical stator defining a generally vertical truncated conical cavity,
   (b) a heat exchange jacket on the wall of the stator opposite the cavity,
   (c) a generally vertical truncated conical rotor mounted for rotation in the cavity defining a relatively thin conical wall,
   (d) a vessel attached to the bottom of the stator defining a collection chamber communicating with the cavity in the stator,
   (e) means for passing a heat exchange fluid over the conical wall of the rotor opposite the cavity,
   (f) means for separating the said heat exchange fluid from the said cavity and collection chamber,
   (g) means for collecting the said heat exchange fluid after passing over the rotor and discharging the same without the vessel, and
   (h) means for introducing reactants into the cavity.
2. An apparatus for conducting reactions comprising,
   (a) the structure in accordance with claim 1 and,
   (b) a shaft extending axially through the vessel and stator, the rotor being mounted on and for rotation with the shaft,
   (c) the shaft having a longitudinal bore extending from the top downwardly and a radial bore connected to the said longitudinal bore extending radially outwardly through the shaft terminating at a level in the proximity of the top of the conical wall of the rotor.
3. An apparatus for conducting reactions comprising:
   (a) the structure in accordance with claim 2 and
   (b) a baffle extending from the shaft beneath the level of the radial bore outwardly to the rotor wall and,
   (c) cooperative sliding sealing means between the baffle and the rotor wall.
4. An apparatus for conducting reactions comprising,
   (a) the structure in accordance with claim 2,
   (b) an upstanding annular deflector mounted on and in spaced relation to the shaft opposite the end of the radial bore,
   (c) a baffle mounted on the shaft beneath the deflector extending outwardly to the conical wall of the rotor in proximity to its bottom edge,
   (d) cooperative, sliding sealing means between the baffle and the conical wall of the rotor.
5. An apparatus for conducting reactions comprising,
   (a) the structure in accordance with claim 4, and
   (b) a horizontally inclined portion on the baffle,
   (c) a discharge conduit connected to the lowermost level of the inclined portion.
6. An apparatus for conducting reactions comprising,
   (a) the apparatus in accordance with claim 1, and,
   (b) first means for introducing material into the cavity on top of the rotor,
   (c) second means separate from the first said means for introducing material into the cavity onto the conical side walls of the rotor.
7. An apparatus for conducting reactions comprising,
   (a) the structure in accordance with claim 6 in which the second said means for introducing material into the cavity comprises,
   (b) a manifold positioned above the stator,
   (c) a plurality of conduits extending from the same level in the manifold downwardly into the cavity at a plurality of positions in the same horizontal plane, and
   (d) means for introducing material into the said manifold.
8. An apparatus for conducting reactions comprising,
   (a) the structure in accordance with claim 6 in which the second said means for introducing material into the cavity comprises,
   (b) a plurality of separate manifolds positioned above the stator,
   (c) at least one conduit extending from the same horizontal plane in each manifold downwardly into the cavity, each conduit from the same manifold terminating at a point in the same horizontal plane, each conduit from different manifolds terminating at points in different horizontal planes, and
   (d) means for introducing material into each manifold.
9. An apparatus for conducting reactions comprising,
   (a) the structure in accordance with claim 6, and,
   (b) separate means for introducing material into each manifold at different rates.
10. An apparatus for conducting reactions comprising,
    (a) the structure in accordance with claim 6, and
    (b) a plurality of separated annular manifolds positioned above and generally coaxial with the stator, each manifold lying in substantially the same horizontal plane,
    (c) a plurality of conduits extending from the same horizontal plane in each manifold downwardly into the cavity at generally equally separated points in the same horizontal plane, the conduits from different manifolds terminating in the cavity in different horizontal planes, and
    (d) separate means for introducing material into each manifold at a controlled rate.
11. An apparatus for conducting reactions comprising,
    (a) the structure in accordance with claim 2, and
    (b) first means for introducing material into the cavity on top of the rotor,
    (c) a plurality of separate manifolds positioned above the stator,
    (d) at least one conduit extending from the same horizontal plane in each manifold downwardly into the cavity, each conduit from the same manifold terminating at a point in the same horizontal plane, each conduit from different manifolds terminating at points in different horizontal planes, and
    (e) means for introducing material into each manifold.

References Cited by the Examiner
UNITED STATES PATENTS

| | | | |
|---|---|---|---|
| 1,629,200 | 5/1927 | Buhtz | 23—252 X |
| 2,498,209 | 2/1950 | Iredale | 23—252 X |
| 2,684,287 | 7/1954 | Seavey | 23—252 X |
| 2,845,262 | 7/1958 | Fessler | 266—34 |
| 3,067,013 | 12/1962 | Lamb | 23—252 |

MORRIS O. WOLK, *Primary Examiner.*

JAMES H. TAYMAN, Jr., *Examiner.*